Dec. 7, 1948.　　　G. C. DEAKINS　　　2,455,566
APPARATUS FOR FORMING IRRIGATION MOUNDS
Filed July 28, 1944　　　2 Sheets-Sheet 1
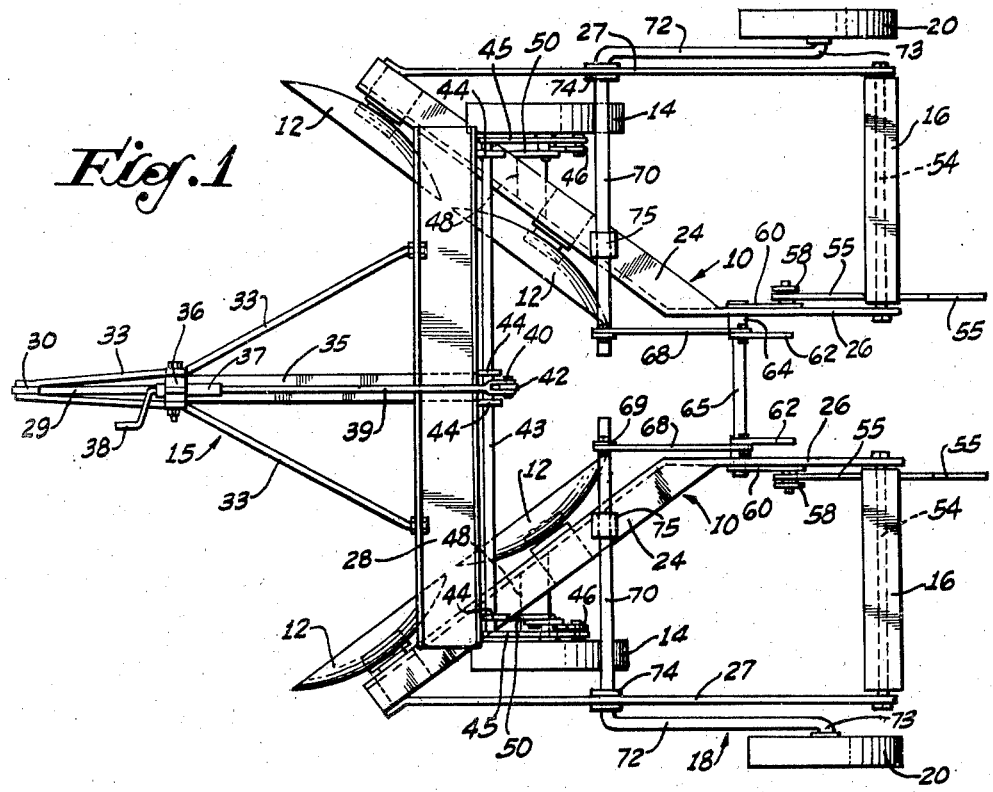
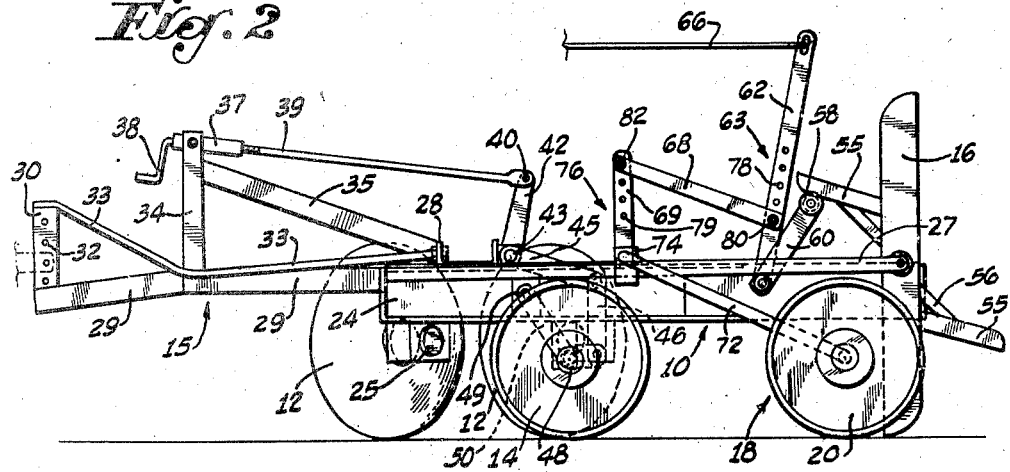
INVENTOR
GROVER C. DEAKINS
BY HARRIS, KIECH, FOSTER & HARRIS
FOR THE FIRM
ATTORNEYS Dec. 7, 1948.   G. C. DEAKINS   2,455,566
APPARATUS FOR FORMING IRRIGATION MOUNDS
Filed July 28, 1944   2 Sheets-Sheet 2
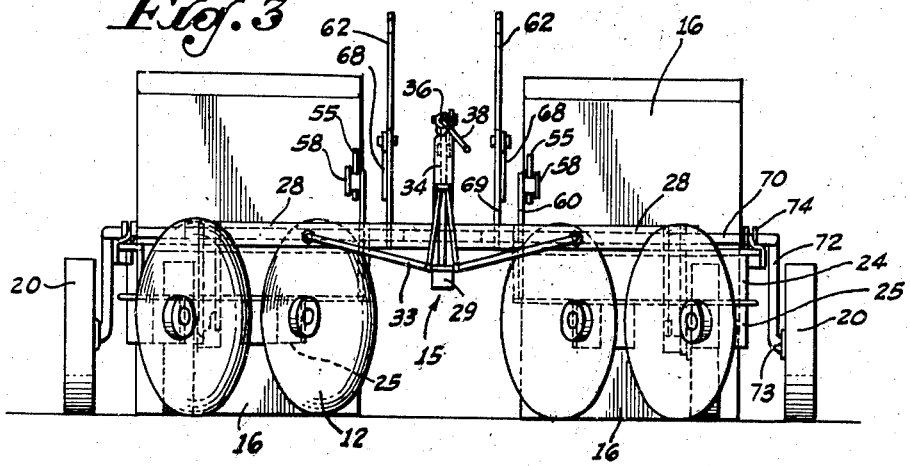
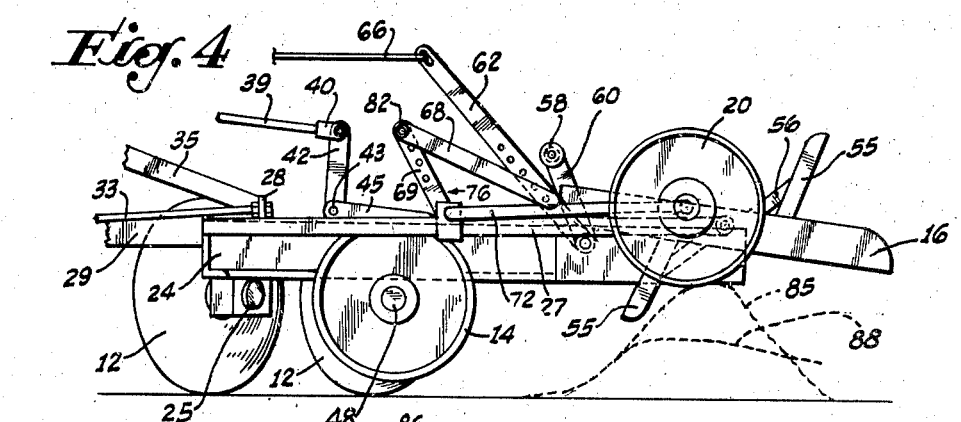
INVENTOR
GROVER C. DEAKINS
BY HARRIS, KIECH, FOSTER & HARRIS
FOR THE FIRM
ATTORNEYS Patented Dec. 7, 1948

2,455,566

UNITED STATES PATENT OFFICE 2,455,566

APPARATUS FOR FORMING IRRIGATION MOUNDS

Grover C. Deakins, Orange, Calif., assignor of one-half to Lester Arthur Baker, Anaheim, Calif.

Application July 28, 1944, Serial No. 546,965

4 Claims. (Cl. 97—55)

This invention relates to devices for forming earthen mounds or ridges, and is especially applicable for ridging orchards and fields in preparation for controlling irrigation operations.

In districts where orchards require periodic irrigation, it is frequently a practice to construct relatively shallow dikes or ridges around the trees. A common practice for irrigating some types of trees is to provide basins about the trees into which irrigation water is run until the basins are filled. It is also sometimes necessary to form ditches to supply the irrigation water to the basins about the trees. In such ridging operations, a common practice is to employ devices frequently known as "ridgers" which are moved from one side of an orchard to the other to make continuous ridges. After completing ridging in one direction, the ridging devices are then run transversely to the ridges first constructed, whereby ridges are formed about four sides of each tree. However, in constructing the transverse ridges, the walls of the ridges originally constructed are partly broken down by the passage of the ridging equipment across them when the transverse ridges are being formed. In order to fill the gaps where ridges are broken down by cross-ridging, auxiliary devices, which are commonly known as "blockers," have been employed which are set across the line of travel and move dirt to the gaps, these blockers then being released by manually controlled means to leave a quantity of earth in the gaps and thereby restore the original ridge construction. However, the manual operation of the means for controlling blocking becomes tedious where a large orchard is being ridged to form basins around trees.

It is the principal object of the present invention to provide for automatic actuation of the blocking devices.

It is a further object of the invention to rely upon the contour of the earth for such automatic control of the blocking means, and it is a specific object to provide means adapted to be lifted by previously formed ridges or mounds as the blocking means approaches gaps in such ridges or mounds, whereby to deposit earth being moved by said blockers into gaps at crossing locations.

It is a particular feature of the invention to employ trip means which normally holds the blocking means in operative position and to move the trip means to and from holding position through the influence of means which follows the contour of previously formed cross ridges. According to one embodiment of the invention, as the contour following means rises over a previously formed cross ridge, the blocking means is released and rises to leave a quantity of earth which was being pushed ahead of it.

By reference to the accompanying drawings and the following description, further objects and features of the invention will become apparent to those skilled in the art. In the drawings, which present certain embodiments of the invention for illustrative purposes, Fig. 1 is a plan view of a conventional ridger provided with my improvement;

Fig. 2 is a side elevation of the structure shown in Fig. 1;

Fig. 3 is a front elevation of the structure shown in Fig. 1;

Fig. 4 is a side elevation similar to that of Fig. 2 showing the contour-following control means in a position wherein the blocking means is released; and Fig. 5 is a diagrammatic view indicating how the automatically operated blocking means functions in forming basins around trees.

The construction shown in these drawings comprises primarily a main framework, generally indicated at 10, carrying on its forward portion a plurality of angularly disposed disks 12 for loosening the soil and shifting it to a central ridge-forming position, a pair of transport wheels 14 adapted to be lowered when the apparatus is being moved to and from working position, a hitch mechanism 15 secured to the forward end of the framework 10 for connection to a draft implement, blockers 16 movably connected to the rear of the framework 10, and novel automatic means 18 of this invention for automatically controlling the actuation of the blockers 16, the automatic control 18 including contour-following means in the form of laterally disposed wheels 20.

The framework 10 comprises angularly disposed beams 24 to the under sides of which are secured mountings 25 for the disks 12, the rear ends of the beams 24 carrying rearwardly extending parallel bars 26, the rear ends of which support the adjacent sides of the respective blockers 16. Extending rearwardly from the forward ends of the beams 24 are side rails 27 whose rear ends provide mountings for the outer sides of the blockers 16, the blockers 16 being in the form of relatively wide elongated rotatable blocks or plates, as illustrated.

The forward ends of the beams 24 are connected by means of a transversely disposed channel iron 28 whose ends are suitably secured, as by welding, to the tops of beams 24. Connected with the middle of the channel iron 28 is the rear end of a tongue 29 which extends forward and forms a part of the hitch 15. Secured to the forward end of the tongue 29 is an upstanding hitch bar 30 provided with means, such as apertures 32, for attachment to any suitable draft vehicle. On opposite sides of the tongue 29 there are provided brace rods 33 whose rear ends are secured to the forward flanges of the channel iron 28, the forward ends of the rods 33 being conveniently connected with the top of the hitch bar 30 whereby the latter is properly retained in position. At an intermediate point of the tongue 29, an upstanding post 34 is welded in position, the brace rods 33 being respectively secured to the outer faces of the post 34. The upper end of the post 34 is positioned by means of a brace bar 35 extending from the cross beam 28 to an upper end of the post 34. Secured in the extreme upper end of the post 34 is a conventional mounting 36 for a conventional internally threaded member 37 which cooperates with a crank handle 38 to adjust the length of a threaded adjusting rod 39 whose rear end is pivoted at 40 to the upper end of an upstanding rock arm 42 secured to a rock shaft 43 whose opopsite ends are pivoted in suitable brackets 44 on the cross beam 28.

The outer ends of the rock arm 43 are fixedly secured to arms 45 pivotally connected to links 46 for lifting in any conventional manner stub axles 48 of the ground wheels 14. The stub axles 48 are pivoted at 49 upon the adjacent beams 24 through the medium of any conventional linkage 50 (Fig. 2). By actuation of the crank 38, the ground wheels 14 may be lowered with respect to the framework 10 in order to raise the disks 12 for the purpose of transport, the reverse operation taking place when it is desired to raise the transport wheels 14 in order that the disks 12 may penetrate the soil for soil loosening and shifting purposes. This means for raising and lowering the ground wheels 14 to dispose the disks 12 in operative and in inoperate positions is known in the art, as is the general frame construction 10 and hitch mechanism 15.

The blockers 16 are pivotally mounted between the bars 26 and the side rails 27 as by means of pintles 54 which extend transversely through the middle portions thereof and have their ends secured in the ends of the bars 26 and the side rails 27.

As indicated in the drawings, the blockers 16 are vertically disposed when in operative position, and are held against rotation when moving earth. For this purpose, a stop arm 55 is provided on each end of each blocker 16 in such position that it projects forward from that portion of the blocker which is uppermost, each stop 55 being suitably braced as at 56. The position of the forward end of the operative stop 55 of each blocker is such as to be engaged by a retainer which is shown as a roller 58 on the free end of an arm 60 which is controlled by a second arm 62 rigidly connected therewith to constitute a bell crank generally indicated at 63. Thus, there is a bell crank 63 for each of the blockers 16. Each of the bell cranks 63 includes a sleeve 64 to which both of the arms 60 and 62 are rigidly connected, and these are rotatably mounted upon a tie rod 65. These parts are mounted in the frame bars 26 in any preferred or conventional manner. For the purpose of manual control of the bell cranks 63 and the retainers 58, cables 66 may be provided which extend forward to an operator's position on a draft vehicle such as a tractor.

For automatic actuation of the bell crank 63, each arm 62 is connected by means of a link 68 with an upstanding arm 69 fixedly secured to a rock shaft 70 provided at its outer end with a fixedly secured arm 72 having at its swinging extremity a bearing 73 for the adjacent contour-following wheel 20. Each rock shaft 70 is carried in appropriate bearing brackets 74 and 75 on the side rails 27 and beams 24, respectively. The arms 69 and 72, together with the rock shaft 70 to which they are fixedly secured, thus constitute, in each instance, a second bell crank 76. By means of the bell cranks 76 and the connecting links 68, elevation of the wheels 20 by travel over an earthen ridge or other substantial earth elevation will cause the respective bell crank 63 to be actuated whereby to withdraw the retainers 58 from engagement with the respective stops 55 and thereby release the respective blockers 16. Thus, the bell cranks 63 and 76, together with the connecting link 68 and the retainers 58, constitute trip mechanisms adapted to release the blockers 16 under predetermined conditions. It is indicated that each of the arms 62 and 69 is provided with a plurality of apertures 78 and 79, respectively, whereby respective pivotal connections 80 and 82 at the ends of the links 68 may be shifted in order that the stops 55 may be released by the retainers 58 under any predetermined elevation of the contour-following wheels 20.

*Operation*

In forming earth ridges for irrigation purposes, or otherwise, with the present structure, the apparatus will be drawn by means of any draft implement, such as a tractor, suitably connected with the hitch bar 30 carried at the forward end of the tongue 29 of the hitch mechanism 15. When the apparatus is to be transported to and from the field or orchard where it is used, the transport wheels 14 will be lowered with respect to the frame 10 through the medium of the crank 38 and adjusting rod 39 so as to elevate the earth working disks 12 and blockers 16 from engagement with the earth's surface. When the working location is reached, the crank 38 will be actuated to raise the transport wheels 14 into inoperative position, as indicated in Fig. 4, so that the disks 12 will penetrate the earth.

In the initial ridging operation, crossridges, such as indicated at 85 in Fig. 5, are first formed throughout an orchard or portion of an orchard or other territory to be irrigated. During this work, the contour-following wheels 20 may be held elevated, if desired, so that the blockers 16 may assume an inoperative position such as that shown in Fig. 4. For example, the cable 66 may be employed for the purpose of maintaining such elevated position. However, the wheels 20 and blockers 16 may assume operative positions, as indicated in Fig. 2, so that the inward sides of the blockers will aid in ridge formation.

When ridges, such as indicated at 86 in Fig. 5, are being formed transversely of the cross ridges 85, contour-following wheels 20 are lowered into the operative position shown in Fig. 2, in which case the retaining rollers 58 on the arms 60 of the bell crank 63 engage under the adjacent stops 55 and hold the blockers 16 in their vertical positions indicated in Fig. 2.

As the implement is drawn forward, the earth working disks 12, being set at angles as best illustrated in Fig. 1, loosen the earth and cause it to be shifted toward the median line of the apparatus so as to form an earthen ridge in line with the tongue 29 and extending between the paths of the disks 12 and parallel to the bars 26 upon which adjacent sides of the blockers 16 are mounted. Thus, the blockers 16 pass alongside the major portion of the ridge as it is formed. Also, the contour-following wheels 20 travel adjacent the outer sides of the blockers 16 and beyond paths of the earth working disks 12.

When a ridge 86 is being formed and a cross ridge 85 is reached, the disks 12 cut into the cross ridge 85 at the areas 88 of Fig. 5 thereby partially breaking down the previously constructed ridge 85 and leaving gaps therein. For the purpose of restoring this damage, bodies 89 of loose earth are being moved forward by the blockers 16. When the contour-following wheels 20 reach the undisturbed portions of the cross ridge 85 beyond the paths of the disks 12, they ride up on the tops of the undisturbed portions of the ridge 85 thereby swinging the arms 72 and 69 of the bell cranks 76 and actuating the bell cranks 63 through the medium of the links 68 so that the retaining rollers 58 on the arms 60 of the bell cranks 63 are withdrawn from the stops 55 on the blockers 16, the parts thereupon assuming the position shown in Fig. 4. The result is that earth which was moved forward by the blockers 16 in the path of the disks 12 into the gaps in the cross ridge 85 is released at the time when the gaps have been filled with such earth, whereby to restore the ridge by small earth piles as indicated at 90.

As the apparatus is moved forward toward the next cross ridge 85, the blockers 16 will readily swing around until the opposite end of each contacts the loose earth, whereupon the adjacent stops 55 engage the retaining rollers 58 which have been restored to retaining position by reason of the fact that the contour-following wheels 20 have descended to the main ground level. At the next cross ridge 85 the operation is repeated.

From the foregoing description, it will be apparent that, when cross ridges 85 are broken down and gaps formed therein by the ridging disks 12, earth for filling the gaps is moved into gap filling position by the blockers 16 and is left therein by elevation of the contour-following wheels 20 which release the blockers 16 at the proper moment. It will also be apparent that the sides of the blockers 16 adjacent the ridge 86 being formed will tend to gather earth, accumulated earth in part gradually working into the ridge 86 just formed whereby to fill in gaps that might otherwise have been left in the disking operation. At the same time small ridges 92 of insignificant elevation may be formed from loose earth escaping around the outer edges of the blockers 16.

Thus, with the apparatus of the present invention orchards may be easily ridged, and the cross ridges 85 automatically repaired as they are crossed by the apparatus when forming the transverse ridges 86. As a result, individual basins are completed around the respective trees. Where smaller basins are desired, either the present apparatus is used to form two sets of ridges between adjacent rows of trees, or the invention may be applied readily to known apparatus adapted to form two ridges in one operation.

While preferred embodiments of the present invention have been shown and described, nevertheless, it is intended to cover all such modifications as fall within the scope of the appended claims.

I claim as my invention:

1. In combination in earth ridging apparatus: a framework adapted to be moved forward; means carried by a forward portion of said framework adapted to loosen earth; earth moving means movably carried by a rearward portion of said framework and adapted to move to and from earth moving position and to move loosened earth into ridge formation; a retainer to hold said earth moving means in earth moving position; a bell crank comprising an arm swingingly mounted on said framework; a contour follower carried by the swinging end of said arm in a position beyond the path of travel of and substantially in line with said earth moving means and an operative connection between said bell crank and said retainer for releasing said retainer from said earth moving means upon predetermined elevation of said contour follower so that said earth moving means will leave loose earth in said ridge formation.

2. A combination according to claim 1 wherein said connection between said retainer and said contour follower is adapted to return said retainer to retaining position upon descent of said contour follower below a predetermined position.

3. In combination in earth ridging apparatus: a framework; earth loosening and ridge forming means carried by said framework; earth moving means carried by said framework and adapted to move loosened earth into cross ridge formation; a bell crank secured to said framework and including a retainer; positioning means carried by said earth moving means adapted to engage said retainer for holding said earth moving means in operative position; a second bell crank secured to said framework; an earth contour follower carried by an outer end of one member of said second bell crank and adapted to rise and fall with earth contours; and an operative connection between said bell cranks for moving said retainer from retaining position as said earth contour follower rises.

4. A combination according to claim 3 wherein means is connected with the first mentioned bell crank for manual withdrawal of said retainer from retaining position.

GROVER C. DEAKINS.

REFERENCES CITED

The following references are of record in the file of this patent:

UNITED STATES PATENTS

| Number | Name | Date |
|---|---|---|
| 32,997 | Hutchinson | Aug. 6, 1861 |
| 1,503,794 | Kruse et al. | Aug. 5, 1924 |
| 1,539,207 | Ranker | May 26, 1925 |
| 1,605,097 | Cook | Nov. 2, 1926 |
| 1,806,389 | Dickerson | May 19, 1931 |
| 1,814,848 | Peacock | July 14, 1931 |
| 2,044,304 | James | June 16, 1936 |